(12) United States Patent
Kim et al.

(10) Patent No.: US 8,120,725 B2
(45) Date of Patent: Feb. 21, 2012

(54) LIQUID CRYSTAL DISPLAY DEVICE WITH PARTICULAR MOLDING-TYPE SUBSTRATES

(75) Inventors: Sung-Joong Kim, Gyeonggi-Do (KR); Yun-Seo Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 538 days.

(21) Appl. No.: 12/318,160

(22) Filed: Dec. 22, 2008

(65) Prior Publication Data

US 2009/0310056 A1 Dec. 17, 2009

(30) Foreign Application Priority Data

Jun. 17, 2008 (KR) .................. 10-2008-0057086

(51) Int. Cl.
G02F 1/1335 (2006.01)
G02F 1/1333 (2006.01)
G01D 11/28 (2006.01)
G09F 13/04 (2006.01)
F21V 21/00 (2006.01)

(52) U.S. Cl. ................ 349/61; 349/62; 349/58; 362/29; 362/97.2; 362/217.1

(58) Field of Classification Search .................... 349/58, 349/61, 62; 362/29, 97.2, 217.1
See application file for complete search history.

(56) References Cited

U.S. PATENT DOCUMENTS

| | | | | |
|---|---|---|---|---|
| 7,549,881 B2 * | 6/2009 | Cho et al. | ...... | 439/235 |
| 7,771,106 B2 * | 8/2010 | Yang et al. | ...... | 362/634 |
| 7,810,943 B2 * | 10/2010 | Ko et al. | ...... | 362/97.2 |
| 7,843,524 B2 * | 11/2010 | Lee et al. | ...... | 349/58 |
| 7,926,965 B2 * | 4/2011 | Cho et al. | ...... | 362/97.1 |
| 2004/0242803 A1 * | 12/2004 | Ohme et al. | ...... | 525/400 |

FOREIGN PATENT DOCUMENTS

CN 101126499 2/2008

* cited by examiner

Primary Examiner — Mike Qi
(74) Attorney, Agent, or Firm — Morgan, Lewis & Bockius LLP

(57) ABSTRACT

Disclosed is an LCD device having molding-type substrates formed so as to have a controllable thickness through simplified fabricating processes. The LCD device comprises: a lower cover; a plurality of lamps disposed on the lower cover with a constant interval therebetween, and providing light; molding-type substrates disposed at both sides of the lower cover, and having lamps coupled thereto; and an LC panel disposed on the lamps, and receiving light, wherein each of the molding-type substrates comprises: a conductive wire to which a voltage is supplied from outside; grippers integrally formed on the conductive wire with a constant interval therebetween, and coupling the lamps; and a bar-shaped mold frame including the conductive wire therein, and exposing the grippers to outside.

7 Claims, 4 Drawing Sheets

LIQUID CRYSTAL DISPLAY DEVICE WITH PARTICULAR MOLDING-TYPE SUBSTRATES

RELATED APPLICATION

This application claims the benefit of Korea Patent Application No. 10-2008-0057086, filed on Jun. 17, 2008, which is herein expressly incorporated by reference in its entirety.

BACKGROUND OF THE INVENTION

1. Field of the Invention

The present invention relates to a liquid crystal display (LCD) device, and more particularly, to an LCD device having molding-type substrates formed so as to have a controllable thickness through simplified fabricating processes.

2. Background of the Invention

In general, flat type display devices have been continuously developed as media to transmit visual information since the beginning of the 21$^{st}$ century. Among the various flat type display devices, liquid crystal display (LCD) devices are being spotlighted as the next generation cathode ray tube (CRT). In the LCD device, data signals are individually supplied to pixels arranged in the form of matrixes according to image information, and optical transmittance of each pixel is controlled, thereby displaying a desired image.

However, the LCD device can not spontaneously emit light therefrom, thereby requiring a backlight to additionally provide light for displaying an image. The backlight may have various types. However, the backlight may be largely divided into an edge type and a direct type according to a structure that a lamp is installed in the backlight. The edge type indicates a backlight provided with one lamp at one side, or a backlight provided with two lamps at both sides. On the contrary, the direct type indicates a backlight having a plurality of lamps therebelow. Here, the lamp may include a cold Cathode Fluorescent Lamp (CCFL), or an External Electrode Fluorescent Lamp (EEFL).

FIG. 1 is an exploded perspective view showing a direct type LCD device in accordance with the conventional art.

As shown in FIG. 1, a reflection plate 42 for reflecting light supplied from a plurality of lamps 50, a light source, to a front surface of an LC panel 10 is attached onto a lower cover 40. The plurality of lamps 50 are fixed onto the reflection plate 40 by a fixing member (not shown). On the reflection plate 42, provided are a diffusion plate 44 for uniformly and forwardly distributing light reflected through the reflection plate 42, and optical sheets 36 for complementing an optical characteristic of light passing through the diffusion plate 44.

A main support 30 for balancing an entire force of the LCD device is laminated on the optical sheets 36. Here, the main support 40 is formed to have a pattern with consideration of the LC panel 10 to be laminated thereon.

The LC panel 10 laminated on the main support 30 is formed by undergoing many unit processes. That is, the LC panel 50 includes an array substrate, a switching device having a thin film transistor at each unit pixel; a color filter substrate having a color filter that represents colors; and an LC injected between the two substrates.

An upper cover 20 that covers an outer periphery of the LC panel 10 and side surfaces of the main support 30 is coupled to the lower cover 40 by an additional coupling means such as hooks.

As a fixing member for fixing the plurality of lamps 50 laminated on the lower cover 40, approximately 16 lamps are arranged in a constant gap therebetween for high brightness in case of an LCD TV having a large screen of 32 inches, whereas approximately 20 lamps are arranged in case of an LCD TV having a large screen of 40 inches.

FIG. 2 is a view showing a cold Cathode Fluorescent Lamp (CCFL) provided at a fixing member, and FIG. 3 is a view showing an External Electrode Fluorescent Lamp (EEFL) provided at a fixing member.

As shown in FIG. 2, the CCFL fixed to a fixing member has two lamps 50 as one unit, and is provided with one rubber holder 60 for protecting a soldering part of the lamps 50. The two lamps 50 and the one rubber holder 60 are mounted in a side support 70, and are fixed on the lower cover 40.

The EEFL is composed of an upper side support and a lower side support 80a. As shown in FIG. 3, a common electrode holder 90 is mounted on the lower side support 80a so as to couple one lamp 50a. The lamp 50a is inserted into the common electrode holder 90, and then the upper side support (not shown) is coupled to the common electrode holder 90. Then, the common electrode holder 90 is entirely fixed onto the lower cover.

Here, the lower side support 80a may include a printed circuit board (PCB) serving as an electrode PCB and having a conductive wire 81, common electrode holders 90 fixed onto the PCB by a soldering process and coupling the lamps 50a, and a connector (not shown) connected to the conductive wire 81 on the PCB so as to supply a voltage to the lamps 50a coupled to the common electrode holders 90.

When the EEFL is driven by using the electrode PCB, an insulation sheet has to be implemented so as to insulate between the conductive wire 81 to which a high voltage is applied, and the lower cover, and so as to obtain a safety distance therebetween. This may cause additional costs.

Since the electrode PCB is large in case of a large LCD device, a problem that the electrode PCB is bent may occur. Furthermore, when the electrode PCB is penetrated or punched, foreign materials may occur due to a material characteristic of the electrode PCB.

Furthermore, when the common electrode holders, or grips for coupling the lamps are fixed onto the electrode PCB, the grips have to be mounted on corresponding regions on the electrode PCB, and then have to undergo a surface mount process (SMT) such as a soldering process. In this case, the grips may be distorted at the corresponding regions.

SUMMARY OF THE INVENTION

Therefore, an object of the present invention is to provide a liquid crystal display (LCD) device having molding-type substrates, each comprising: a conductive wire to which a voltage is supplied from outside; grippers (grips) integrally formed on the conductive wire; and a mold frame formed of a molding material, and encompassing the conductive wire.

To achieve these and other advantages and in accordance with the purpose of the present invention, as embodied and broadly described herein, there is provided a liquid crystal display (LCD) device, comprising: a lower cover; a plurality of lamps disposed on the lower cover with a constant interval therebetween, and providing light; a plurality of molding-type substrates disposed at both sides of the lower cover by being coupled to each other, and having lamps coupled thereto; and an LC panel disposed on the lamps, and receiving light, wherein each of the molding-type substrates comprises: a conductive wire to which a voltage is supplied from outside; grippers (grips) integrally formed on the conductive wire, and coupling the lamps; a bar-shaped mold frame including the conductive wire therein, and exposing the grippers to outside;

and a coupling means formed at the end of the conductive wire, and coupled with an adjacent conductive wire.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, an LCD device according to the present invention will be explained in more detail.

Figure 1:
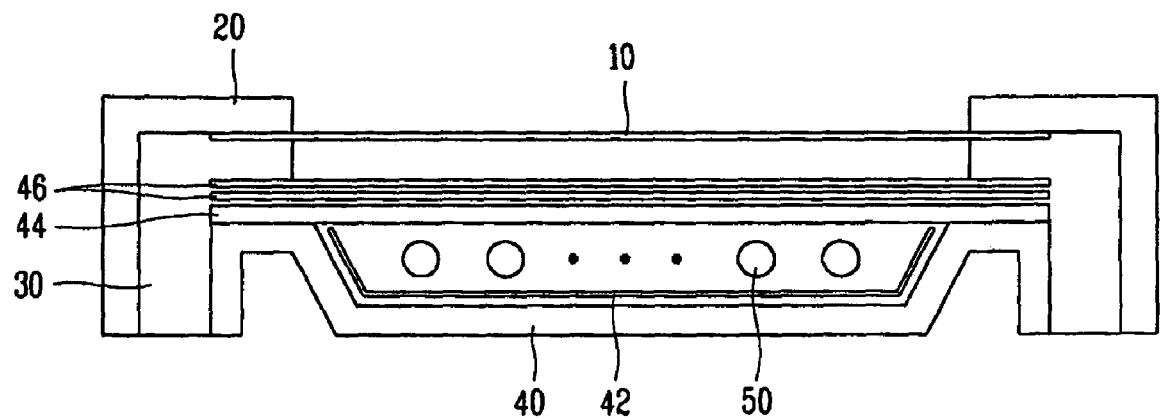
FIG. 1 is a sectional view showing a direct type liquid crystal display (LCD) device in accordance with the conventional art.
Figure 2:
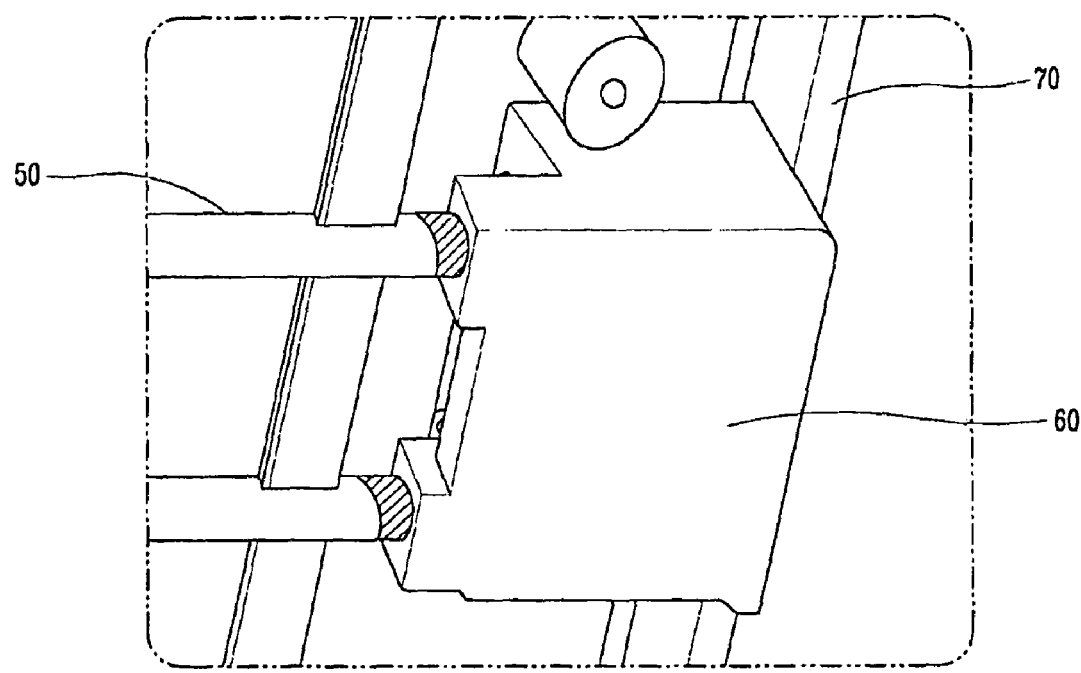
FIG. 2 is a view showing a cold Cathode Fluorescent Lamp (CCFL) provided at a fixing member.
Figure 3:
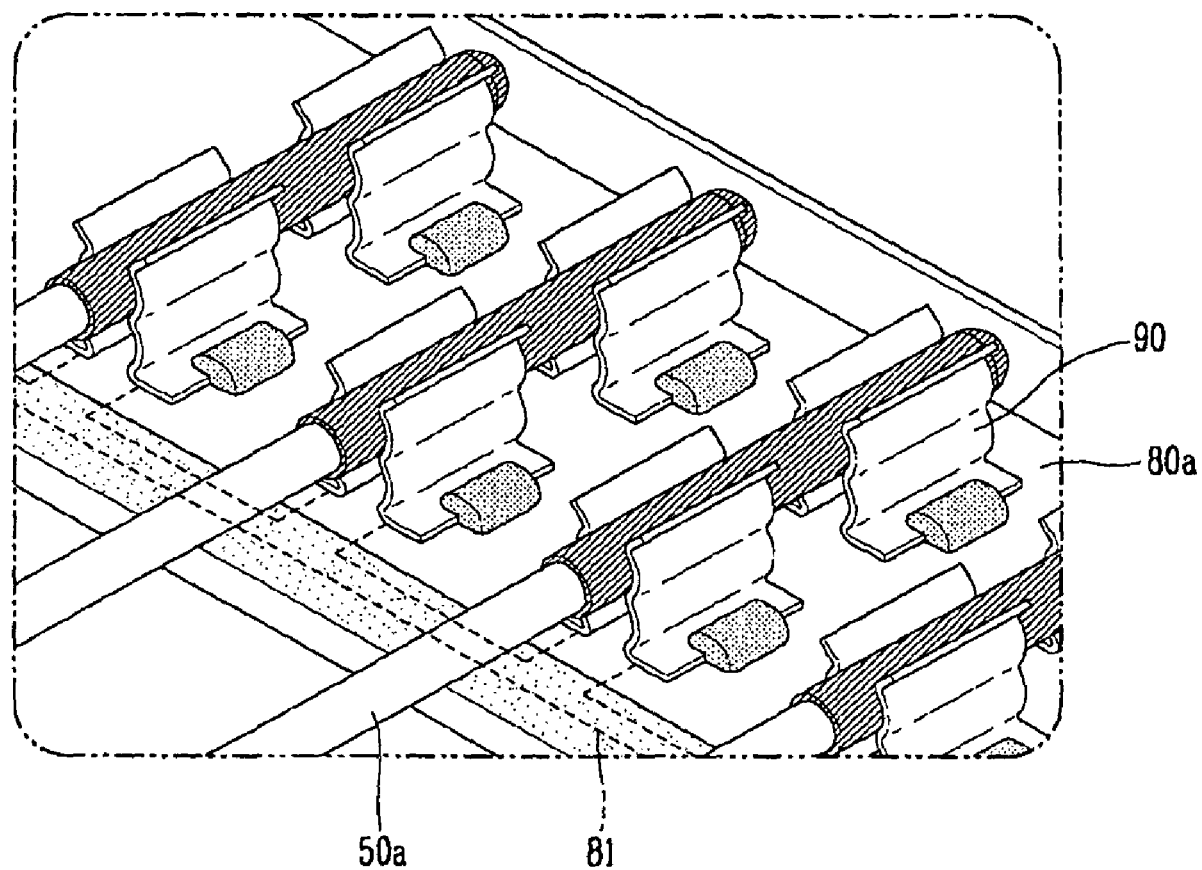
FIG. 3 is a view showing an External Electrode Fluorescent Lamp (EEFL) provided at a fixing member.
Figure 4:
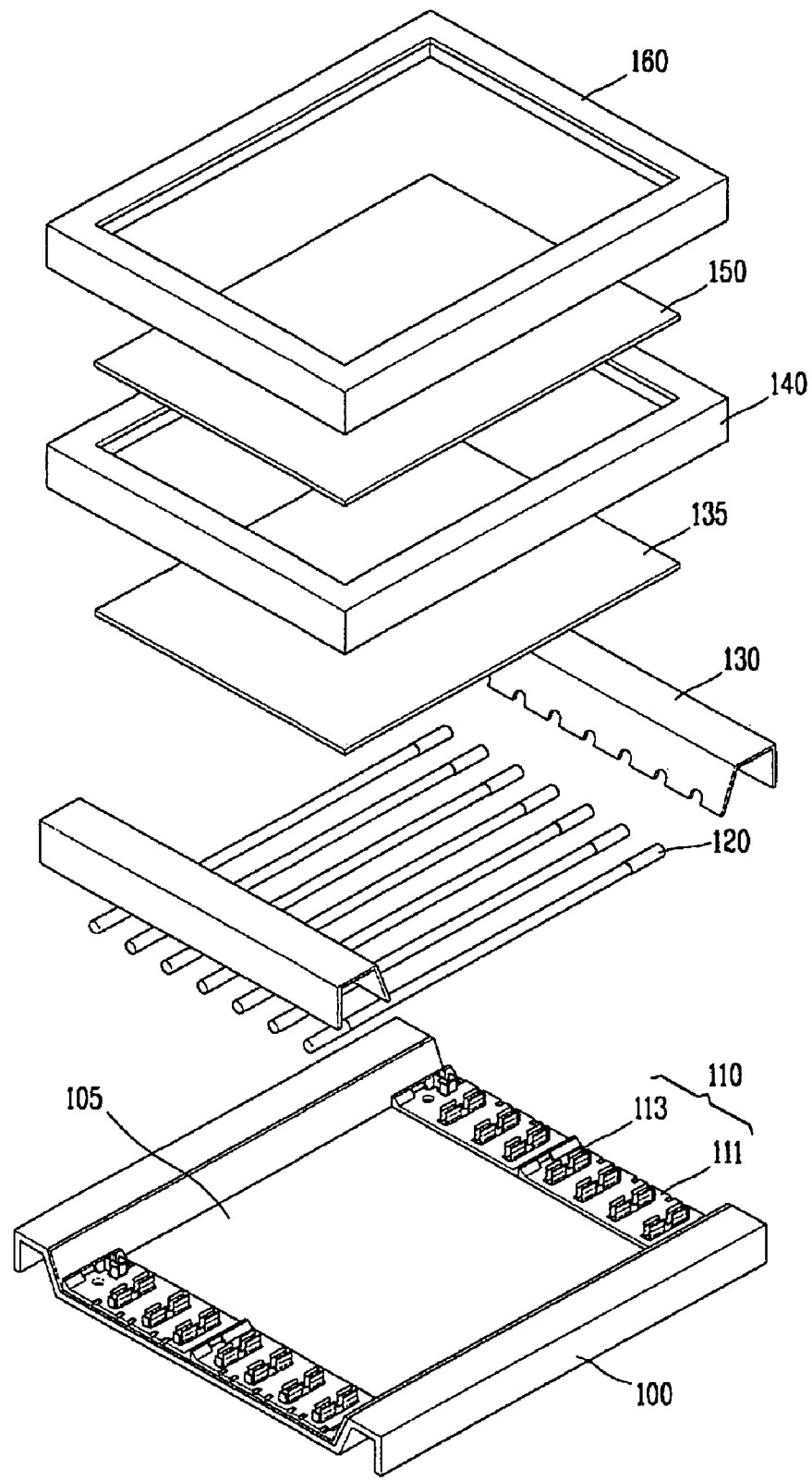
FIG. 4 is an exploded perspective view showing a direct type LCD device according to a first embodiment of the present invention.
Figure 5:
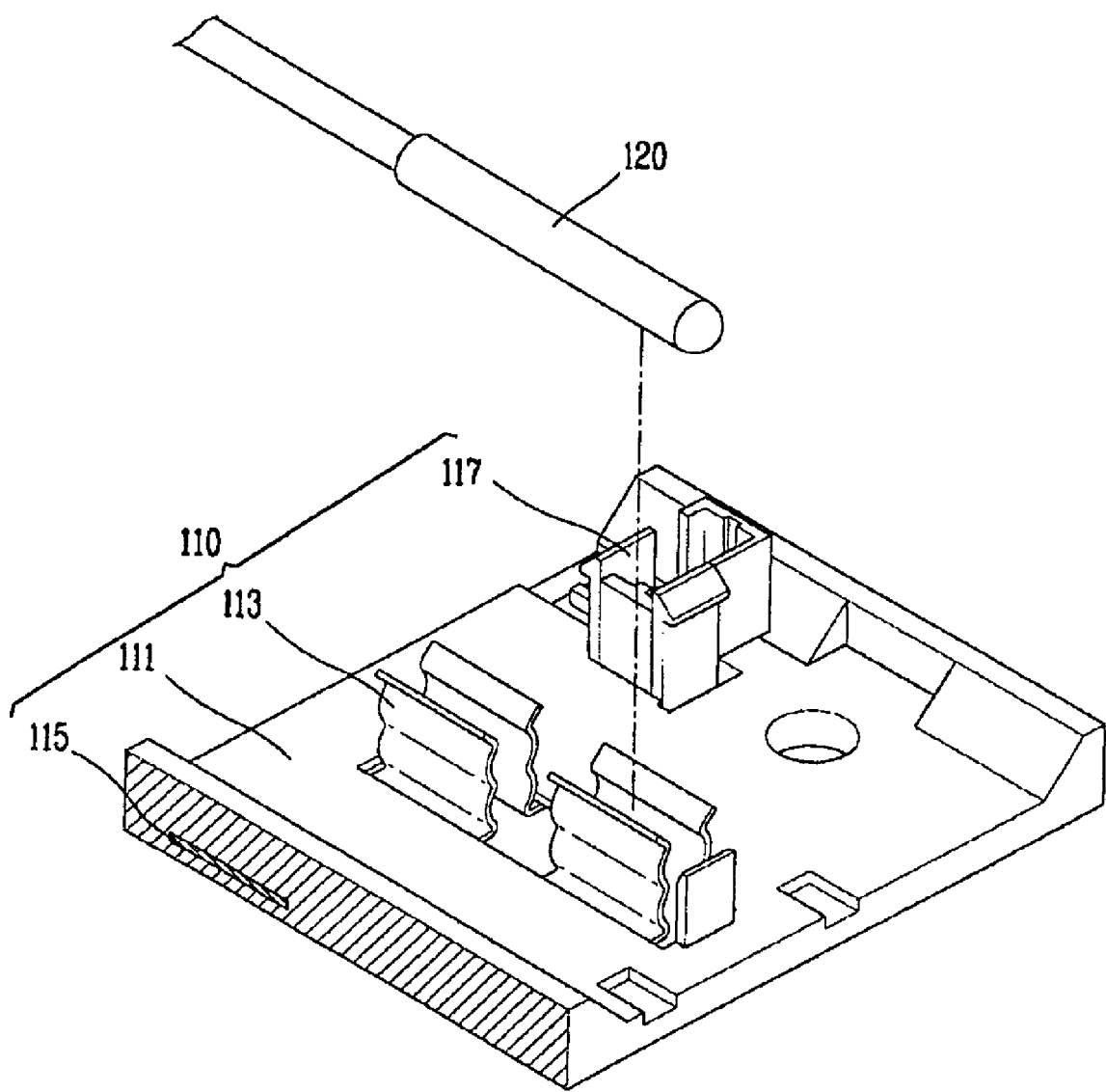
FIG. 5 is a sectional perspective view showing a molding-type substrate of FIG. 4.

FIG. 4 is an exploded perspective view showing a direct type LCD device according to a first embodiment of the present invention, and FIG. 5 is a sectional perspective view showing a molding-type substrate of FIG. 4.

As shown in FIGS. 4 and 5, a direct type liquid crystal display (LCD) device comprises: a lower cover 100; a plurality of lamps 120 disposed on the lower cover 100 with a constant interval therebetween; molding-type substrates disposed at both sides of the lower cover 100, each including a conductive wire 115 to which a voltage is applied from outside, grippers 113 integrally formed on the conductive wire 115 with a constant interval therebetween, and a mold frame 111 that encompasses the conductive wire 115 and exposing the grippers 113 to outside; and an LC panel 150 disposed above the lamps 120, and coupled to the grippers 113, for receiving light.

The lower cover 100 is composed of a lower frame formed of aluminum or electrolytic galvanized iron (EGI), etc. thereby to constitute a bottom surface, and side frames vertically (or slantly) extending from one or more edges of the lower frame.

Molding-type substrates 110 for driving the lamps 120 by receiving a high AC voltage from external first and second inverters are provided at both sides of the lower cover 100. The molding-type substrates 110 includes the mold frame 111 contacting two bottom surfaces of the lower cover 100 thus to be supported thereby; the conductive wires 115 formed in the mold frames 111 and having voltages applied from outside; and the grippers 113 integrally formed on the conductive wires 115 with a constant interval therebetween, and exposed to outside of the mold frames 111, for coupling the lamps 120.

More concretely, a connector 117 for receiving a high AC voltage from the external first and second inverters is formed on the mold frame 111 of the molding-type substrate 110. Firstly, a voltage is applied to the grippers 113 integrally formed on the conductive wire 115 with a constant interval therebetween and exposed to outside of the mold frame 111, through the conductive wire 115 formed in the mold frame 111 electrically connected to the connector 117. Then, the grippers 113 serving as a ballast capacitor introduce a stable current to the lamps 120. Here, the grippers 113 may indicate conductive electrodes.

The molding-type substrate 110 may be formed in a metallic pattern by an injection-molding process. In other words, the conductive wire 115 of the molding-type substrate 110, and the grippers 113 integrally formed on the conductive wire 115 are supplied to a metallic pattern. Then, a poly-based insulating material is injected into the metallic pattern, thereby forming the mold frame 111 that encompasses the conductive wire 115 and formed to have a bar-shape or a rectangular shape. The conductive wire 115, the grippers 113, and the mold frame 111 forms the molding-type substrate 110.

By integrally forming the conductive wire 115 and the grippers 113, and then by forming the mold frame 111 that encompasses the conductive wire 115 through an injection-molding process, the grippers 113 are more prevented from being distorted than those of the conventional PCB. More concretely, in the conventional PCB, the grippers are mounted on the conductive wire formed in the PCB, and then a reflow process such as a soldering process is performed. In this case, the grippers may be distorted when vibrated. Accordingly, in the present invention, the grippers 113 are integrally formed on the conductive wire 115, which more simplifies the fabrication processes than in the conventional art.

Here, the conductive wire 115 and the grippers 113 of the molding-type substrate 110 may be formed of the same material, or may be formed of different materials. The conductive wire 115 and the grippers 113 (or conductive electrodes of the grippers 113) may be formed of one of conductive materials including Au, Ag, Cu, Al, etc. In the present invention, the conductive wire 115 and/or the grippers 113 are preferably formed of one of Cu or Al.

The mold frame 111 that encompasses the conductive wire 115 and exposing the grippers 113 to outside may be formed to have a controllable thickness at the time of being injection-molded. The reasons are in order to maintain a safety distance between the conductive wire 115 formed in the mold frame 111, and the lower cover 100, and to implement an electrical shielding therebetween, when a high voltage is supplied from outside to the conductive wire 115 through the connector 117. Once the mold frame 111 has a controllable thickness, the insulating sheet aforementioned in the conventional art, etc. is not required.

The molding-type substrate 110 is formed so as to be dividable. When it is assumed that the LCD device includes a backlight having 12 lamps, two molding-type substrates 110, each having five grippers 113 thereon, are coupled to each other, and then are coupled to one molding-type substrate 110 having two grippers 113 thereon. Here, the conductive wires 115 formed in the molding-type substrates 110 adjacent to each other are electrically connected to each other by various coupling means. One molding-type substrate 110 implemented as two molding-type substrates 110 are coupled to each other, and disposed at corners of the lower cover 100 is coupled to another molding-type substrate 110 having the connector 117, thereby receiving a voltage from external inverters. This does not require the molding-type substrate 110 to be formed with a large size when a large LCD device is to be fabricated, thereby preventing the molding-type substrate 110 from being bent.

A reflection plate 105 is attached onto a middle portion of the lower cover 100 having the molding-type substrates 110 at both sides thereof. The reflection plate 105 is implemented as a film formed of white polyester, or a film onto which a metallic material such as Ag and Al is coated. Here, the reflection plate 105 has reflectivity of about 90~97% for visible rays. The thicker a coated film is, the higher the reflectivity is.

The plurality of lamps 120 are coupled onto the grippers 113 arranged at both sides of the lower cover 100, and disposed on the molding-type substrate 110 with a constant interval therebetween. Here, a distance between the lamps 120 coupled to the grippers 113, and the reflection plate 105 disposed on a rear surface of the lamps 120 is constantly maintained within a range of about 5 mm. If a distance between the lamps 120 and the lower cover 100 having the reflection plate 105 attached thereto is less than 5 mm, a current leakage may occur from the lamps 120 due to a parasitic capacitance between the lamps 120 and the lower cover 100.

Here, as the lamps 120, one of a Cold Cathode Fluorescent Lamp (CCFL), an External Electrode Fluorescent Lamp (EEFL), and a Hot Cathode Fluorescent Lamp (HCFL) may be used. However, the EEFL is preferably used.

Side supports 130 for protecting the molding-type substrates 110 disposed at both sides of the lower cover 100 are provided at both sides of the lower cover 100. The side supports 130 fabricated by a pressing process are composed of inclined frames (not shown) having half-circle shaped lamp fixing portions (not shown) contacting the lower frame of the lower cover 100 with a constant inclination, for fixing the lamps 120; vertical frames (not shown) spaced from the inclined frames by a constant gap in a vertical direction; and upper frames (not shown) horizontally extending from the inclined frames and the vertical frames towards an upper direction.

On the side supports 130 provided at both sides of the lower cover 100, provided is an optical member 135 disposed on the lamps 120 with both edge regions thereof supported. Here, the optical member 135 may include at least one of a diffusion plate for uniformly diffusing light emitted from the lamps 120, a prism sheet for enhancing a frontal brightness of light passing through the diffusion plate, and a protection sheet for protecting the prism sheet from an external force, and enhancing a viewing angle.

A main support 140 for balancing an entire force of the LCD device is coupled onto the optical member 135. The main support 140 is formed with a prescribed stepped portion to laminate the LC panel 150 thereon. Also, the main support 140 is formed to have a rectangular frame having an opened middle portion so as to pass light provided from the lamps 120 through the LC panel 150.

The LC panel 150 laminated on the main support 140 is formed by undergoing many unit processes. That is, the LC panel 150 includes a thin film transistor (TFT) array substrate, a switching device having a thin film transistor at each unit pixel; a color filter substrate having a color filter that represents colors; and an LC injected between the two substrates.

An upper cover 160 is coupled to the lower cover 100 by hooks, etc., with encompassing four edges of the LC panel 150, and side surfaces of the main support 140.

In the present invention, the molding-type substrates are fabricated so as to have a controllable thickness, thereby implementing an electrical shielding for a safety distance between the conductive wires disposed in the substrates and provided with a high voltage, and the lower cover. This allows an additional insulating sheet not to be required, thereby reducing the fabrication costs.

Furthermore, since the grippers are integrally formed on the conductive wires to fabricate the molding-type substrates, the grippers are more prevented from being distorted than those of the conventional art. Accordingly, inferiority of the molding-type substrates is minimized.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
    a lower cover;
    a plurality of lamps disposed on the lower cover with a constant interval therebetween, and providing light;
    molding-type substrates disposed at both sides of the lower cover, and having lamps coupled thereto; and
    an LC panel disposed on the lamps, and receiving light,
    wherein each of the molding-type substrates comprises:
    a conductive wire to which a voltage is supplied from outside;
    grippers integrally formed on the conductive wire with a constant interval therebetween, and coupling the lamps;
    a connector connected to one end side of the conductive wire to receive a voltage from an outer voltage source; and
    a bar-shaped mold frame including the conductive wire therein, and exposing the grippers to outside,
    wherein the connector and the grippers are disposed on the same plane of the bar-shaped mold frame and the conductive wire is disposed in the inside of the bar-shaped mold frame.

2. The LCD device of claim 1, wherein the lamp is an External Electrode Fluorescent Lamp (EEFL).

3. The LCD device of claim 1, wherein the molding-type substrate is formed of a poly-based resin.

4. A liquid crystal display (LCD) device, comprising:
a lower cover;
a plurality of lamps disposed on the lower cover with a constant interval therebetween, and providing light;
a plurality of molding-type substrates disposed at both sides of the lower cover by being coupled to each other, and having lamps coupled thereto; and
an LC panel disposed on the lamps, and receiving light,
wherein each of the molding-type substrates comprises:
a conductive wire to which a voltage is supplied from outside;
grippers integrally formed on the conductive wire with a constant interval therebetween, and coupling the lamps;
a bar-shaped mold frame including the conductive wire therein, and exposing the grippers to outside;
a coupling means formed at the end of the conductive wire to couple adjacent conductive wires; and
a connector connected to one end side of the conductive wire to receive a voltage from an outer voltage source,
wherein the connector and the grippers are disposed on the same plane of the bar-shaped mold frame and the conductive wire is disposed in the inside of the bar-shaped mold frame.

5. The LCD device of claim 4, wherein the lamp is an External Electrode Fluorescent Lamp (EEFL).

6. The LCD device of claim 4, wherein the molding-type substrate is formed of a poly-based resin.

7. The LCD device of claim 4, wherein the connector is disposed at an outer molding-type substrate coupled to the outermost molding-type substrate.

* * * * *